B. W. BIVENS.
HAY STACKER.
APPLICATION FILED FEB. 19, 1913.
1,098,553.
Patented June 2, 1914.
2 SHEETS—SHEET 1.
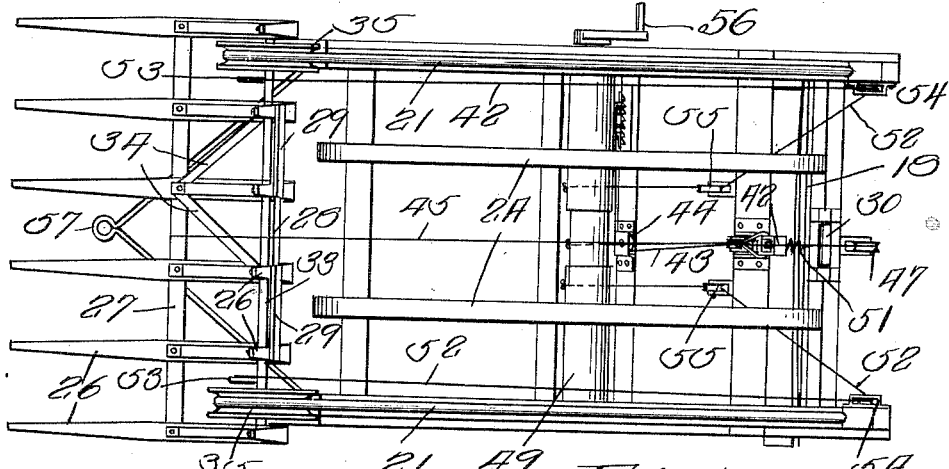
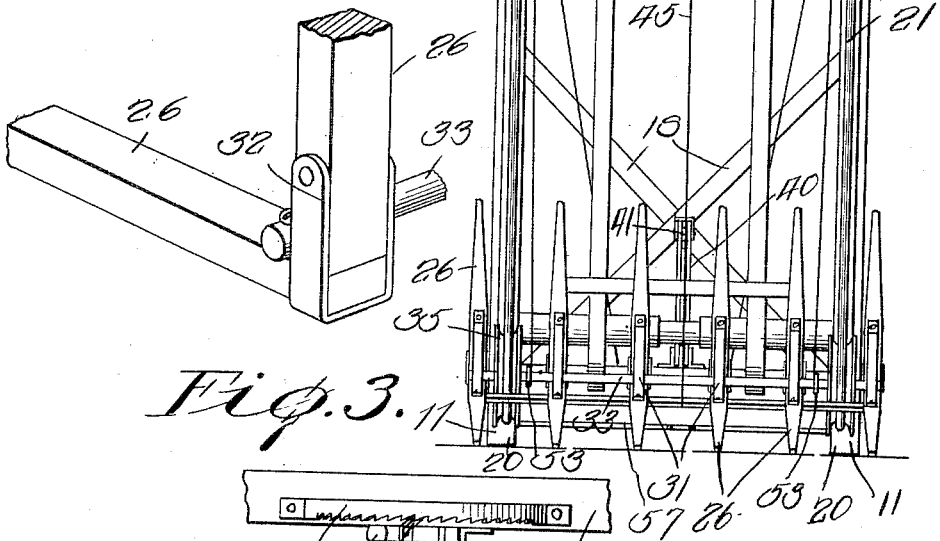
Witnesses
Inventor
B. W. Bivens
By
Attorneys

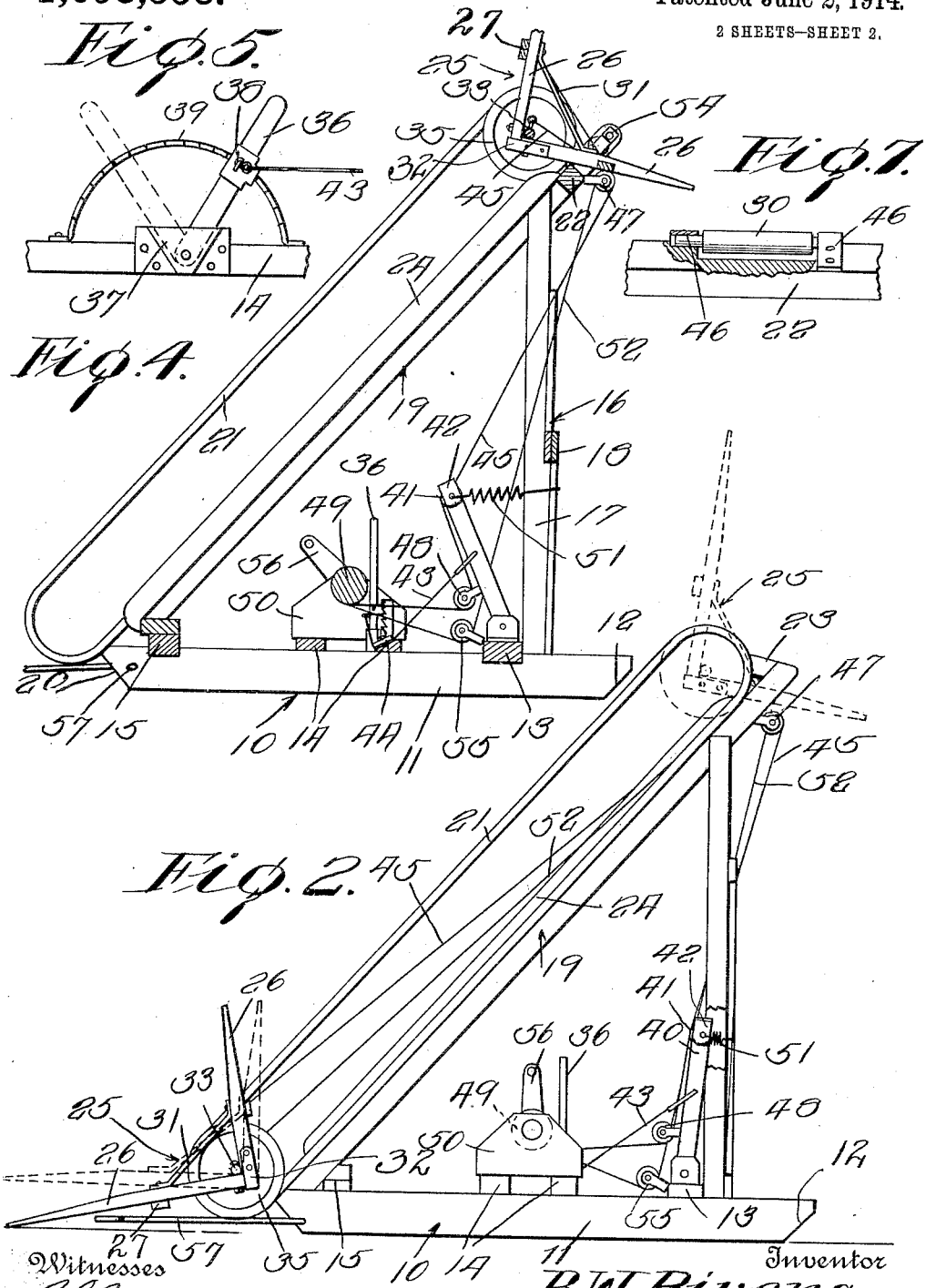

UNITED STATES PATENT OFFICE.

BERT WILSON BIVENS, OF STEAMBOAT SPRINGS, COLORADO.

HAY-STACKER.

1,098,553. Specification of Letters Patent. Patented June 2, 1914.

Application filed February 19, 1913. Serial No. 749,456.

*To all whom it may concern:*

Be it known that I, BERT W. BIVENS, a citizen of the United States, residing at Steamboat Springs, in the county of Routt, State of Colorado, have invented certain new and useful Improvements in Hay-Stackers; and I do hereby declare the following to be a full, clear, and exact description of the invention, such as will enable others skilled in the art to which it appertains to make and use the same.

This invention relates to novel and useful improvements in hay stackers and the essential object of the invention is evolved in the provision of a hay stacker which includes a carrier adapted to travel on an inclined track, the carrier when loaded being drawn up the track and automatically moved to a dumping position, after which it is returned by its weight to a reloading position.

Another essential object of the invention is evolved in the provision of a hay stacker mechanism in which the carrier is pivotally supported in its journals to move up and down the track and in which connection is made by means of an adjustable throw lever to permit the carrier to move to a receiving position for lowering the teeth thereof in contact with the ground and then raising the teeth of the carrier after the same has been loaded, while novel means are provided for drawing the carrier up the track to a dumping position for discharging the hay on to the stack, by a suitable source of power, such means being designed to overcome side draft, which as is well-known is very destructive to a machine of this character.

Still another essential object of the invention is evolved in the provision of a machine which can be readily controlled by a single operator and which is of such simple construction, that it may be operated with a minimum amount of repairs and with increased useful life.

With the above and other objects in view, the invention resides more particularly in the peculiar combinations and arrangements of parts which will be partly illustrated as a preferred embodiment in the accompanying drawings and described in the specification, although the invention is protected for all desirable changes and uses within the scope of the invention as claimed.

In the drawings: Figure 1 is a top plan view of a hay stacker constructed in accordance with the invention. Fig. 2 is a side elevation thereof, the carrier being shown in dotted lines in a loaded and in a partial discharge position. Fig. 3 is a plan view of an adjustable throw lever employed. Fig. 4 is a longitudinal sectional view of the device in dumping position. Fig. 5 is a detail view of the adjustable throw lever which serves to raise and lower the carrier, whereby the latter may be disposed in a receiving position and held in a loaded position to travel up the inclined track without accidental discharge of its load. Fig. 6 is a front elevation of the machine. Fig. 7 is a detail view of an antifriction roller used with the device. Fig. 8 is a detail view of the connection between two of the teeth of the carrier.

In illustrating the preferred embodiment of the invention, my improved hay stacker is shown as embodying a base frame 10 consisting of side bars 11 forming runners which have their rear ends inclined upwardly as shown at 12 to prevent the same from projecting into the earth. The base frame further consists of cross braces 13, 14 and 15 connecting the runners or side bars forming the same, whereby they are held in spaced parallel relation. An upright frame 16 is mounted at the discharge end of the stacker, the same consisting of side bars 17 and cross braces 18 connecting the same whereby said frame will form a support for an inclined track frame 19. In practice, the base frame is preferably made about 25 feet long, the upright frame or side posts thereof 20 feet high and the track frame 32 feet long.

The forward extremities of the runners are beveled as shown at 20 opposite to the side bars of the track frame and in conjunction therewith, serve to support inclined tracks 21 which preferably consist of elongated loops or sections of metal of circular cross section, the tracks extending in close proximity to the ground surface to prevent the forward ends of the side bars of the base frame or runners from projecting into the earth. A cross member 22 connects the upper extremities of the side bars or posts 17 and the adjacent portions of the side bars of the track frame, the latter projecting to the rear of the upright frame and having blocks 23 mounted between the same and the adjacent ends of the track, to brace the latter. A pair of guide bars 24 also connect the cross member 22 and the cross brace 15 longitudinally of the stacker, the upper ends of the guide bars being beveled as shown to gradually bring the carrier to a discharged position when the same is moved up the inclined tracks in a manner to be hereinafter made apparent.

The carrier is designated by the numeral 25 and consists of a plurality of angular tines or teeth 26 disposed at right angles to each other and in coincident relation, such teeth extending forwardly being longer than the upwardly extending teeth and connected by a cross bar 27. The centralmost of the upwardly extending teeth are connected by a cross brace 28 and the teeth on opposite sides thereof are connected thereto by cross braces 29, the cross brace 28 being located above the bottom edges of the teeth so that when the carrier is traveling up the track of the inclined frame, the cross braces 29 will bear on the guide bars and the cross brace 28 will pass over an antifriction roller 30 carried centrally upon the cross member 22. The teeth are also connected by diagonal braces 31 formed of metal to make the structure more rigid as well as by strap connections 32 at their connected extremities.

Secured to the angular portion of the carrier is an axle 33 which is made rigid by braces 34 and which has rotatably journaled thereon between the outermost pairs of teeth, grooved rollers or wheels 35, engaged between the top and bottom portions of the tracks whereby displacement of the rollers and the carrier therewith is prevented. It will be observed that the carrier is normally at the lower end of the track frame and may be moved about the axle as a pivot extending through the wheels to move the longer teeth in contact with the ground for receiving a load from a sweep rake after the latter has gathered the hay from the windrows, or for raising said teeth and moving the shorter teeth in contact with the guide bars and preventing accidental displacement of the hay after the carrier has been loaded. For this purpose a throw lever 36 is pivotally mounted in a socket 37 secured to the forward longitudinal edge of the rearmost cross brace 14, the sockets serving to limit the movement or throw of the lever in opposite directions, while the lever is provided with a spring catch or projection 38 adapted to coöperate with the teeth of the segmental rack bar 39 which is also mounted on said cross brace.

An arm 40 is pivotally mounted on the cross brace 13 and carries an idler pulley 41 in its upper end, which is slotted or bifurcated for this purpose, the pivot of the pulley being retained in position by an inverted U-shaped bearing plate 42, while the arm is connected to the throw lever through the instrumentality of a flexible connection 43 which passes around a guide pulley 44 mounted in a forwardly inclined position in a recess in the rearmost cross brace 14. A flexible connection 45 is attached to the carrier forwardly of its pivot and passes over the antifriction roller 30 which is arranged upon the cross member 22 and held in strap bearings 46 secured thereto and is then passed over a guide pulley 47 projecting rearwardly from said cross member, the connection being then extended around the idle pulley 41 on the arm and around the guide pulley 48 projecting forwardly from the pivoted arm and its other extremity is attached centrally to a drum 49 journaled in bearings 50 mounted on the ends of the cross braces 14. Thus when the lever is at the inward position to release the pull upon the connection 43, the resilient element or spring 51 connecting the upright frame to the arm will draw the latter rearwardly thus releasing the connection 45 to lower the carrier to the loading position. When the carrier is loaded, the lever is thrown to the opposite position and locked, thus exerting pull on the connection 43 and swinging the arm forwardly against the action of the resilient element or spring for exerting pull on the connection 45 to move the carrier on its pivot until the teeth are both inclined upwardly in the manner shown in Fig. 2 of the drawings in dotted lines, when the cross braces 29 will engage the guide bars 24. It is now desired to provide means for moving the carrier up the track to complete the loading, elevating and dumping operation and for this purpose, flexible connections 52 are secured to upwardly and forwardly extending guide eyes 53 secured to the axle to assist in the pivoting of the latter and the carrier, said connections being passed around the guide pulleys 54 attached to the extended ends of the side bars of the track frame and then passed downwardly and beneath guide pulleys 55 projecting forwardly from the rearmost cross brace 13, the other extremities being attached to the drum to be wound thereon simultaneously with the connection 45. Thus when the drum is rotated through any suitable means, such as a combustion engine, or team, (not shown) for turning a crank 56 at one end of the drum, the cables will be wound on the latter to elevate the carrier which when it passes over the upper ends of the guide bars, will be moved to a dumping position smoothly and gradually, after which it may be lowered by its weight. The machine is adapted to be drawn to and from the place of use through the instrumentality of a drag connection 57 attached to the connected lower extremities of the side bars of the track frame and the forward extremities of the base frame or runners.

I claim—

1. In a hay stacker, a base frame having runners, an upright frame mounted thereon, an inclined track frame supported upon said frame, elongated loop tracks supported on said inclined frame, wheels movable in the tracks, a carrier having an axle engaged by the wheels to move therewith along the track, guide bars longitudinally of the inclined track and having tapered upper ends, cross braces carried by the carrier to move along said bars when the carrier is being elevated, lever operated means for tilting the carrier and power means for moving the carrier up the track, said carrier being adapted to return by its weight.

2. In a haystacker, an inclined track frame, a track supported on said frame, wheels movable on the track, a carrier having an axle whereon said wheels are mounted, guide bars extending longitudinally of the frame and having tapered upper ends, cross braces fixed to the carrier to move along said bars when the carrier is being elevated, means for tilting the carrier, and power means for moving the carrier up the track.

3. In a haystacker, an inclined track frame, tracks supported on said frame, a carrier provided with an axle, wheels journaled on said axle and movable on the track, guide bars extending longitudinally of the inclined track and having tapered upper ends, cross braces carried by the carrier to move along said bars when the carrier is being elevated, a winding drum, a flexible element connecting the winding drum with the lower part of the carrier, a second flexible element, connecting the winding drum with the upper part of the carrier whereby movement of the second flexible element relative to the first element will rotate the carrier about the axle, an idler pulley over which said second flexible element passes, and an arm pivotally mounted on the frame and carrying said idler pulley.

In testimony whereof, I affix my signature, in the presence of two witnesses.

BERT WILISON BIVENS.

Witnesses:
L. D. GORDON,
D. W. KILLEEN.

---

Copies of this patent may be obtained for five cents each, by addressing the "Commissioner of Patents, Washington, D. C."